US012733766B2

(12) United States Patent
Agam et al.

(10) Patent No.: US 12,733,766 B2
(45) Date of Patent: Sep. 15, 2026

(54) EXTRACTOR FOR COLD BREW COFFEE AND THE LIKES

(71) Applicant: Sensotech Inc., Montreal (CA)

(72) Inventors: Uri Agam, Montreal (CA); Pino Marcovecchio, Montreal (CA)

(73) Assignee: SENSOTECH INC., Montreal (CA)

( * ) Notice: Subject to any disclaimer, the term of this patent is extended or adjusted under 35 U.S.C. 154(b) by 324 days.

(21) Appl. No.: 18/464,614

(22) Filed: Sep. 11, 2023

(65) Prior Publication Data

US 2024/0081578 A1 Mar. 14, 2024

Related U.S. Application Data

(60) Provisional application No. 63/375,293, filed on Sep. 12, 2022.

(51) Int. Cl.

| | |
|---|---|
| ***A47J 31/18*** | (2006.01) |
| ***A23F 5/26*** | (2006.01) |
| ***A47J 31/40*** | (2006.01) |
| ***A47J 31/52*** | (2006.01) |
| ***A47J 47/16*** | (2006.01) |

(52) U.S. Cl.
CPC ................. *A47J 31/18* (2013.01); *A23F 5/26* (2013.01); *A47J 31/407* (2013.01); *A47J 31/52* (2013.01); *A47J 47/16* (2013.01); *A23V 2002/00* (2013.01)

(58) Field of Classification Search
CPC .. A47J 31/18; A47J 31/20; A47J 31/36; A47J 31/4496
USPC .................................................... 99/287, 297
See application file for complete search history.

(56) References Cited

U.S. PATENT DOCUMENTS

| | | | | |
|---|---|---|---|---|
| 6,973,869 | B1 | 12/2005 | Lin | |
| 9,682,112 | B2 | 6/2017 | Madhavamenon et al. | |
| 9,833,102 | B2 | 12/2017 | Peterson et al. | |
| 10,744,470 | B2 | 8/2020 | Lee | |
| 11,744,396 | B1 * | 9/2023 | Brown | A23F 5/26 99/280 |
| 2008/0032030 | A1 | 2/2008 | Babaev | |
| 2009/0263550 | A1 * | 10/2009 | Navarini | A47J 31/0615 99/280 |
| 2010/0015302 | A1 | 1/2010 | Bates et al. | |
| 2010/0272870 | A1 | 10/2010 | Hsu et al. | |
| 2011/0297004 | A1 * | 12/2011 | Figura | A47J 31/057 99/290 |

(Continued)

FOREIGN PATENT DOCUMENTS

| | | | | |
|---|---|---|---|---|
| CN | 109998375 A | * | 7/2019 | A47J 31/4403 |
| DE | 102019108509 A1 | * | 10/2020 | A47J 31/44 |

(Continued)

OTHER PUBLICATIONS https://www.rdworldonline.com/rd-100-2020-winner/ultrasound-nano-bubble-cold-brew-coffee-and-tea-machine/.

(Continued)

*Primary Examiner* — Chris Q Liu
(74) *Attorney, Agent, or Firm* — Agence de Brevets Fournier

(57) ABSTRACT

A cold beverage extractor includes a container; and an ultrasonic atomizer that is mounted to the container and being operable to accelerate extraction of at least some compounds from a substance dissolved in a water-based solvent when the water-based solvent is in the container so as to be in contact with the ultrasonic atomizer.

26 Claims, 11 Drawing Sheets

(56) References Cited

U.S. PATENT DOCUMENTS

| | | | | |
|---|---|---|---|---|
| 2013/0101710 | A1 | 4/2013 | Ha'eri | |
| 2020/0148985 | A1 * | 5/2020 | Probst | A47J 31/20 |

FOREIGN PATENT DOCUMENTS

| | | | | |
|---|---|---|---|---|
| WO | WO2017010670 | A1 | 1/2017 | |
| WO | WO-2023196404 | A1 * | 10/2023 | A23L 2/56 |

OTHER PUBLICATIONS

Xingchen Zhai et al., 'Feasibility of Ultrasound-Assisted Extraction for Accelerated Cold Brew Coffee Processing . . . ', Frontiers in Nutrition, Mar. 18, 2022.

https://labdownunder.com/smooth-vibrations-how-ultrasound-can-brew-the-perfect-coffee/.

* cited by examiner

EXTRACTOR FOR COLD BREW COFFEE AND THE LIKES

CROSS REFERENCE TO RELATED PATENT APPLICATION

This application claims the benefit of U.S. Provisional Application No. 63/375,293, filed on Sep. 12, 2022, the content of which is incorporated by reference herein.

FIELD

The present disclosure relates to cold brewing of beverages. More specifically, the present disclosure is concerned with and extractor for cold brew coffee or the likes.

BACKGROUND

There are two families of brewing devices, those that fully immerse the coffee in the brew water and those that flow the water through the coffee.

The slowest part of coffee extraction is determined by the speed at which coffee flavor moves through the solid particles to the water-coffee interface. Such speed increases with temperature.

A higher particulate temperature causes more of the tasty compounds trapped within the coffee particulates to be extracted. However, a higher temperature also letting more of the unwanted compounds to dissolve in the water too.

For that last reason, cold brew coffee extraction gains more and more in popularity. However, the process is slow for the above reason.

SUMMARY

According to illustrative embodiments, there is provided a cold beverage extractor comprising:

- a container; and
- an ultrasonic atomizer that is mounted to the container and being operable to accelerate extraction of at least some compounds from a substance dissolved in a water-based solvent when the water-based solvent is in the container so as to be in contact with the ultrasonic atomizer.

According to other illustrative embodiments, there is provided a cold beverage extracting process:

- providing a container;
- mounting an ultrasonic atomizer to the container;
- inserting in the container a mixture including a water-based solvent and a substance to be dissolved in the water-based solvent; the ultrasonic atomizer being mounted to the container so as to be in fluid contact with the mixture; and
- operating the ultrasonic atomizer, resulting in an accelerate extraction of at least some compounds from the substance.

Other objects, advantages, and features of the cold beverage extractor and extracting process will become more apparent upon reading the following non-restrictive description of illustrative embodiments thereof, given by way of example only with reference to the accompanying drawings.

DETAILED DESCRIPTION

Figure 1A:
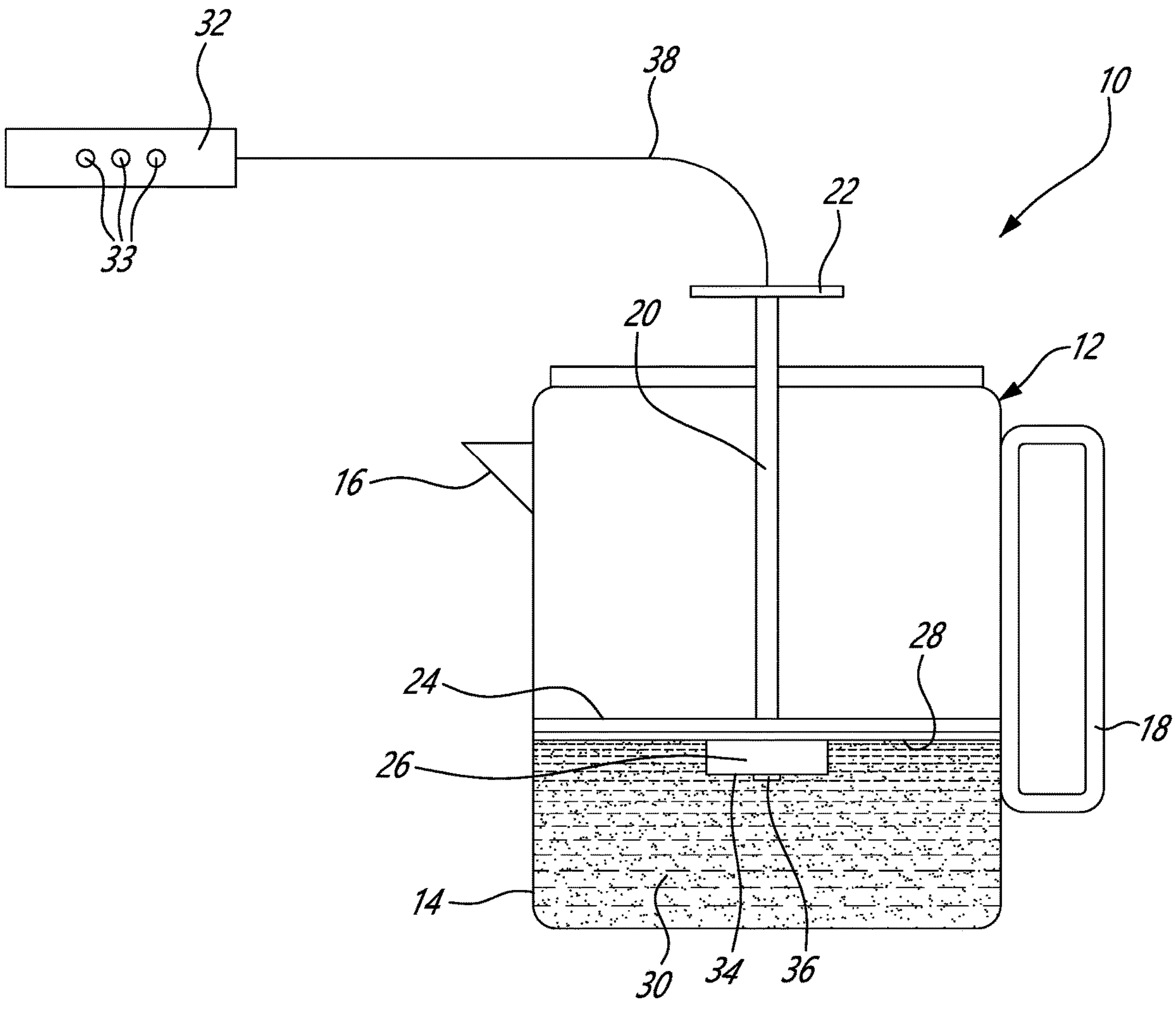
FIGS. 1A-1B and 2A-2C are schematic views of a cold brew coffee extractor according to first, second, third, fourth and fourth-fifth illustrative embodiments respectively; the extractors being in the form of French-press-style coffee makers

It should be understood that the elements of the drawings are not necessarily depicted to scale, since emphasis is placed upon clearly illustrating the elements and structures of the present embodiments.

In the following description, similar features in the drawings have been given similar reference numerals, and in order not to weigh down the figures, some elements are not referred to in some figures if they were already identified in a precedent figure. Herein, it shall further be noted that, for avoiding unnecessary details obscuring the invention, only device structures and/or processing steps closely relevant to schemes according to the invention are shown in the accompanying drawings while omitting other details less relevant to the invention.

The embodiments, geometrical configurations, materials mentioned and/or dimensions shown in the figures are optional and are given for exemplification purposes only.

The use of the word “a” or “an” when used in conjunction with the term “comprising” in the claims and/or the specification may mean “one”, but it is also consistent with the meaning of “one or more”, “at least one”, and “one or more than one”. Similarly, the word “another” may mean at least a second or more.

As used in this specification and claim(s), the words “comprising” (and any form of comprising, such as “comprise” and “comprises”), “having” (and any form of having, such as “have” and “has”), “including” (and any form of including, such as “include” and “includes”) or “container” (and any form of container, such as “contain” and “contains”), are inclusive or open-ended and do not exclude additional, un-recited elements.

A cold beverage extractor 10 according to a first illustrative embodiment will now be described with reference to FIG. 1A. The cold beverage extractor 10 is in the form of a cold brew coffee extractor.

The extractor 10 comprises a container 12 substantially in the form of a French-press type coffee maker, which includes a main reservoir 14, an integral spout 16 and a handle 18 secured on a peripheral side of the main reservoir 14. Like a conventional French press, the container 12 further comprises a plunger 20 having a pusher 22 at one end and a filter screen 24 at the other end. In operation, after the extraction process is ended, the plunger 20 is depressed to move the filter screen 24 downwardly, forcing and maintaining the coffee sediment (not shown) at the bottom of the container 12.

The extractor 10 further comprises an ultrasonic atomizer 26, which is secured to the screen 24 on the side 28 thereof opposite the pusher 22.

The ultrasonic atomizer (UA) 26 is believed to be well known in the art. It is traditionally used to convert liquid into a mist. However, as can be seen in FIG. 1A, such is not the function of the UA 26, as evidence by the fact that it is secured to the container 12 below the screen 24, and as such it is intended to be immersed in the beverage mixture 30. The beverage mixture 30 is made of loose coffee grinds mixed in water.

Figure 6:
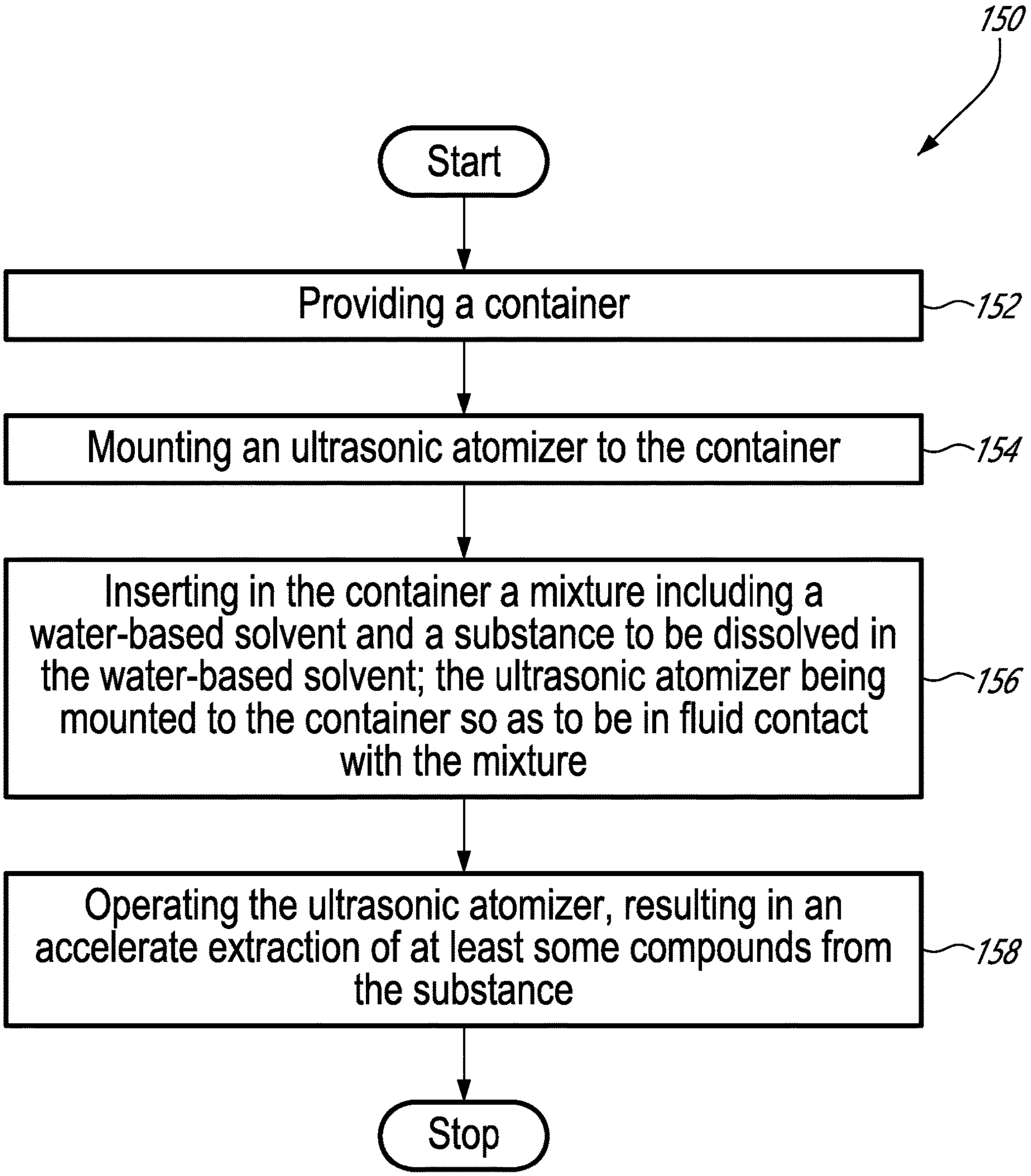
FIG. 6 is a flowchart illustrating a cold beverage extracting process according to an illustrative embodiment.

Apart from the presence of the UA 26, which greatly diminishes the extraction time, the extractor 10 includes the functionality of a conventional French press, which will not be described herein for concision purposes. An illustrative embodiment of a cold beverage extracting process 150 is also summarized in FIG. 6.

The UA 26 is driven by an electronic controller 32, including a power supply, that causes liquid to be drawn towards and through the UA 26. The controller 32 is provided in a casing that can include conventional indicator lights 33 to inform the user of one or more states of the extractor 10.

Indeed, ultrasonic nozzles operate by converting high-frequency sound waves into mechanical energy that is transferred into a liquid, creating standing waves. As the liquid exits the atomizing surface of the nozzle, it is broken into a fine mist of uniform micron sized droplets.

Unlike pressure nozzles, ultrasonic atomizer does not force liquids through a small orifice using high pressure in order to produce a spray. Liquid is fed through the UA 26, without pressure, and is atomized due to ultrasonic vibrations which generate waves in the solvent.

Figure 5:
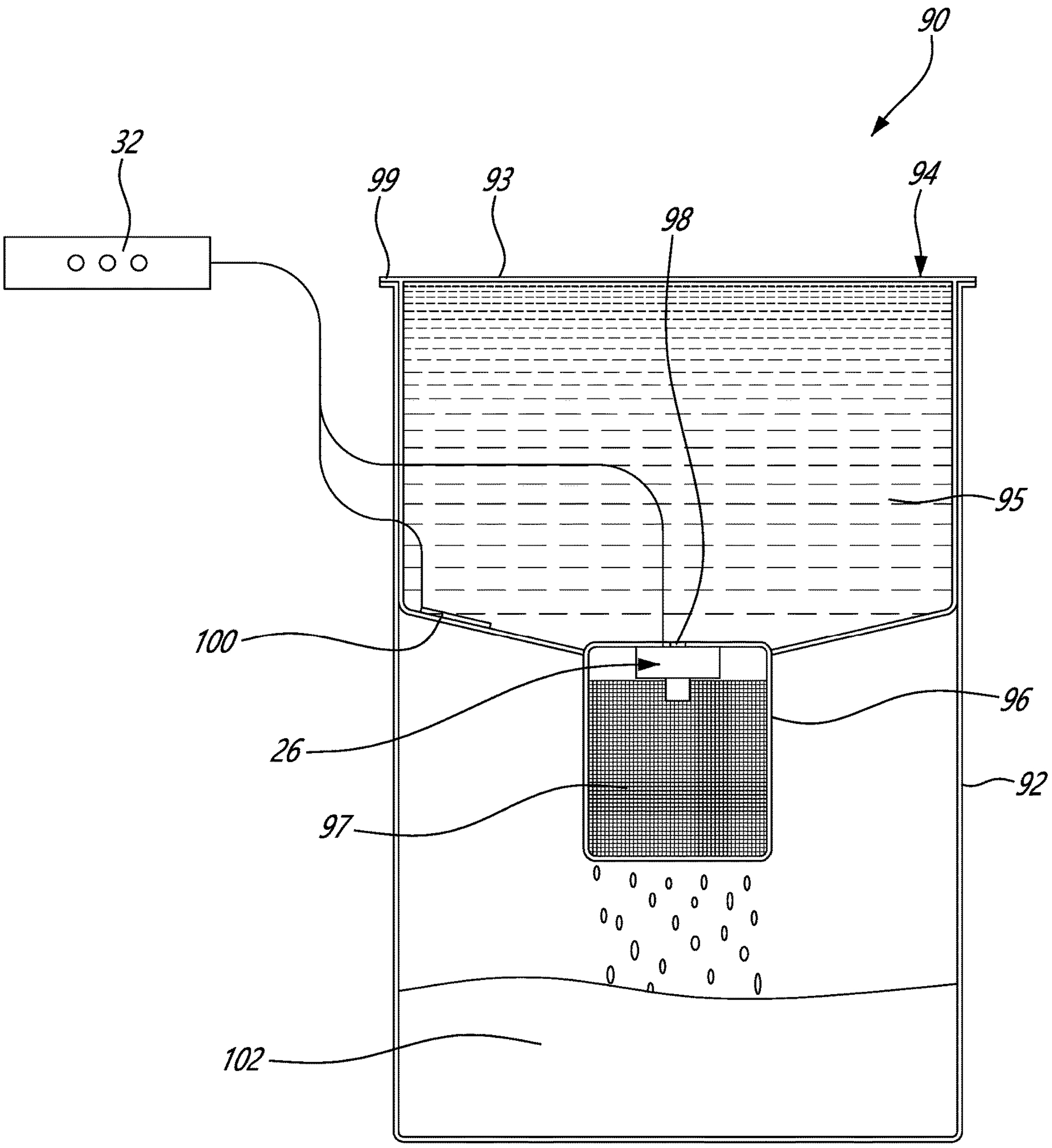
FIG. 5 is a schematic view of cold brew coffee extractor according to an tenth illustrative embodiment.

In all illustrated embodiments, except the one shown in FIG. 5, the atomizer 26 is immersed in the liquid and generates standing waves that improves the extraction process.

In the embodiment shown in FIG. 5, liquid is introduced to the UA 26 through and exit as a mist with fine droplets which then being carried out by gravity.

The UA 26 can be driven continuously or according to a predetermined pattern of pulses.

The UA 26 has been found to accelerate the extraction of components from the coffee grinds into the water. For example, cold brew coffee can be obtained using the extractor 10 in a very short time with at least similar quality than coffee obtained traditionally in 15 hours.

The extractor 10 according to the first illustrative embodiment is further provided with a TDS sensor 36 (Total Dissolved Solids), which is integrated to the UA 26 and operatively coupled to the controller 32 to be used therefrom to determine when a quality of the coffee dissolved with the water, such as without limitation its concentration, reached a predetermined value, which can allow the process to automatically stop at that point.

According to another illustrative embodiment, another type of sensor, allowing for example to measure the color of the beverage mixture 30, can be used alternatively or additionally to the TDS sensor 36. According to still another illustrative embodiment, the TDS sensor 36 is omitted.

According to still another embodiment, the controller 32, that can alternatively be part of the container handle 18 (see FIG. 2C), includes a display (not shown), and or is coupled to a timer (not shown), which is used to determine the end of the extraction process.

Returning to FIG. 1A, the plunger 20 is hollow, which allows passage for a wire 38 that connects the UA 26 and sensor 36 to the controller 32. During operation, the strainer 24 can be positioned at any level inside the container 12 as long as the UA 36 is immersed in the mixture 30.

According to another illustrative embodiment, one or both of the UA 26 and sensor 36 is wirelessly coupled to the controller 32.

Figure 1B:
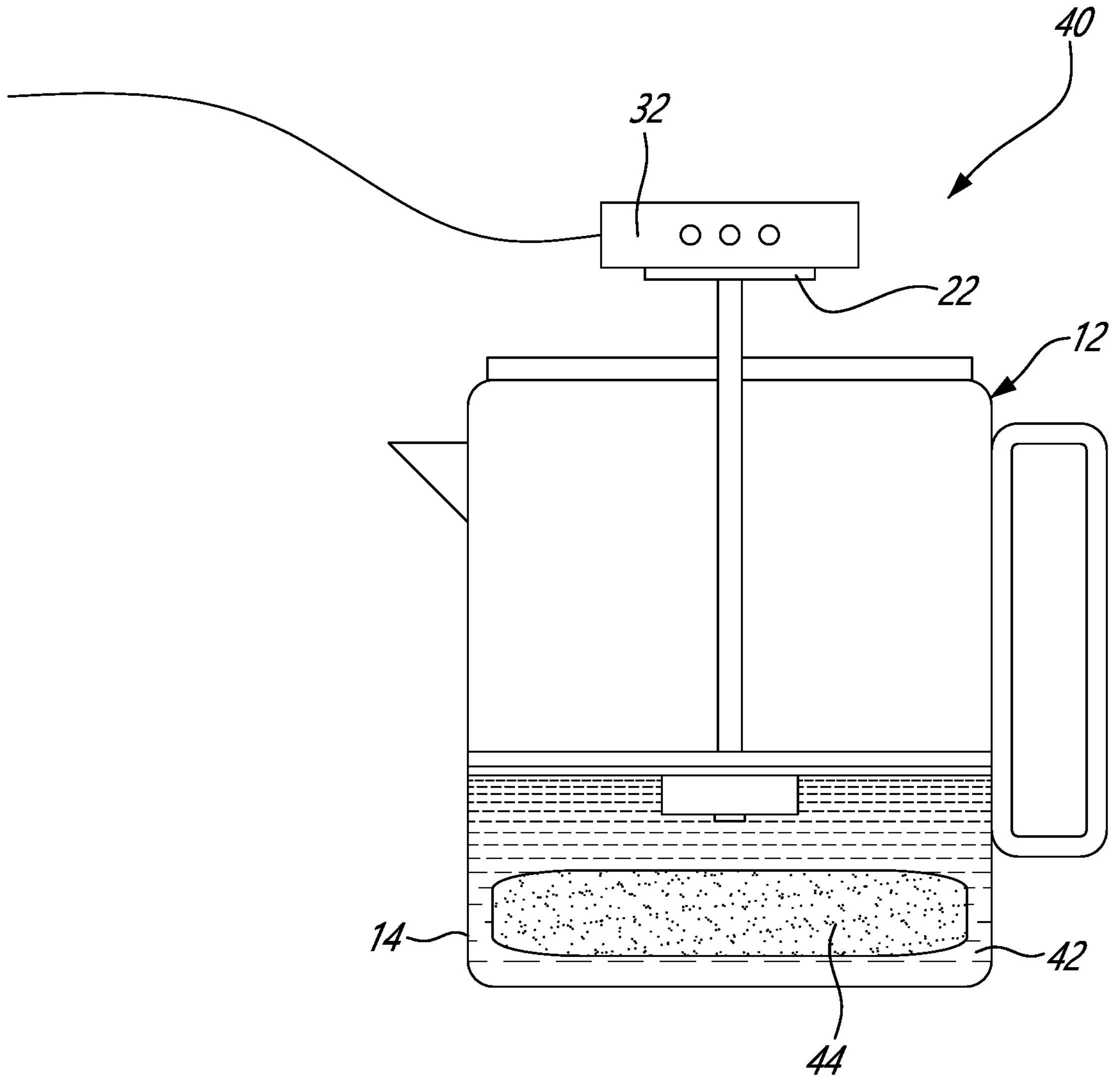

With reference to FIG. 1B, an extractor 40 according to a second illustrative embodiment will now be described. Since the Extractor 40 is similar to the extractor 10, only the differences therebetween will be described herein for concision purposes.

In the extractor 40, compared to the extractor 10, the controller 32 is integrated to the pusher 22, and the coffee is introduced in the main reservoir 14 of the container 12, in the water 42, in the form of a well-known coffee filter bag 44. The coffee can be provided in such a form in all illustrated embodiments, except when steering is being used. According to such an embodiment, the screen 24 can be omitted.

Figure 2A:
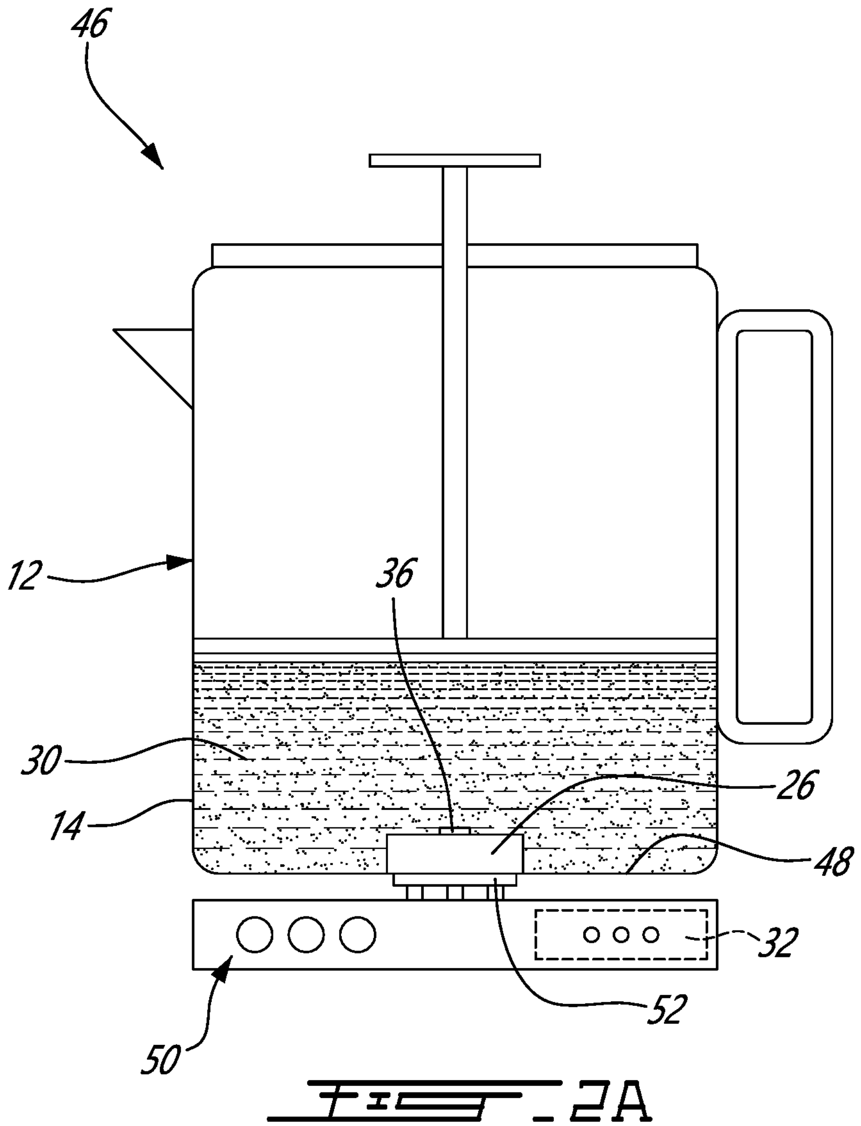
Figure 2C:
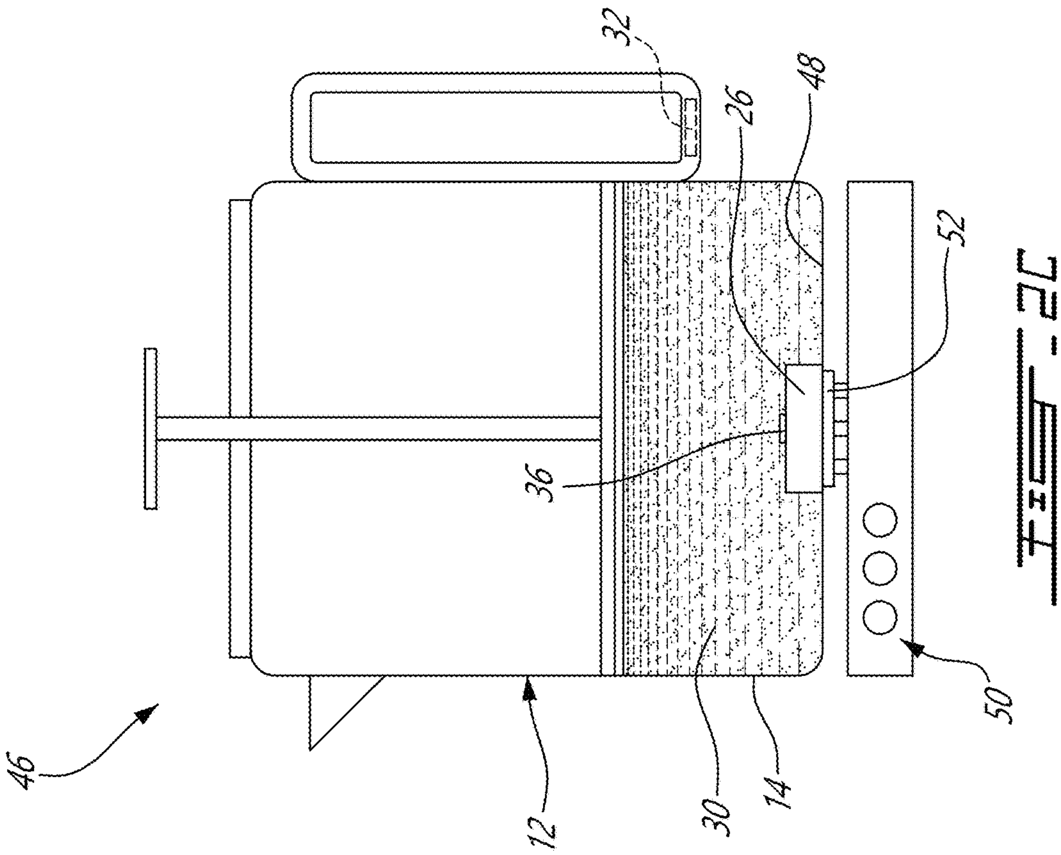

With reference to FIG. 2A, an extractor 46 according to a third illustrative embodiment will now be described. Since the extractor 46 is similar to the extractor 10, only the differences therebetween will be described herein for concision purposes.

According to this illustrative embodiment, the UA 26 and sensor 36 are secured to the main reservoir 14 of the container 12 inside thereof at the bottom 48 thereof so as to be in fluid contact with the beverage mixture 30 in the container 12. The controller 32 is included in a docking base 50 that further includes a coupler 52, for example in the form of a feedthrough, for operatively coupling both the UA 26 and sensor 36 to the controller 32 by sitting the container 12 to the base 50.

Figure 2B:
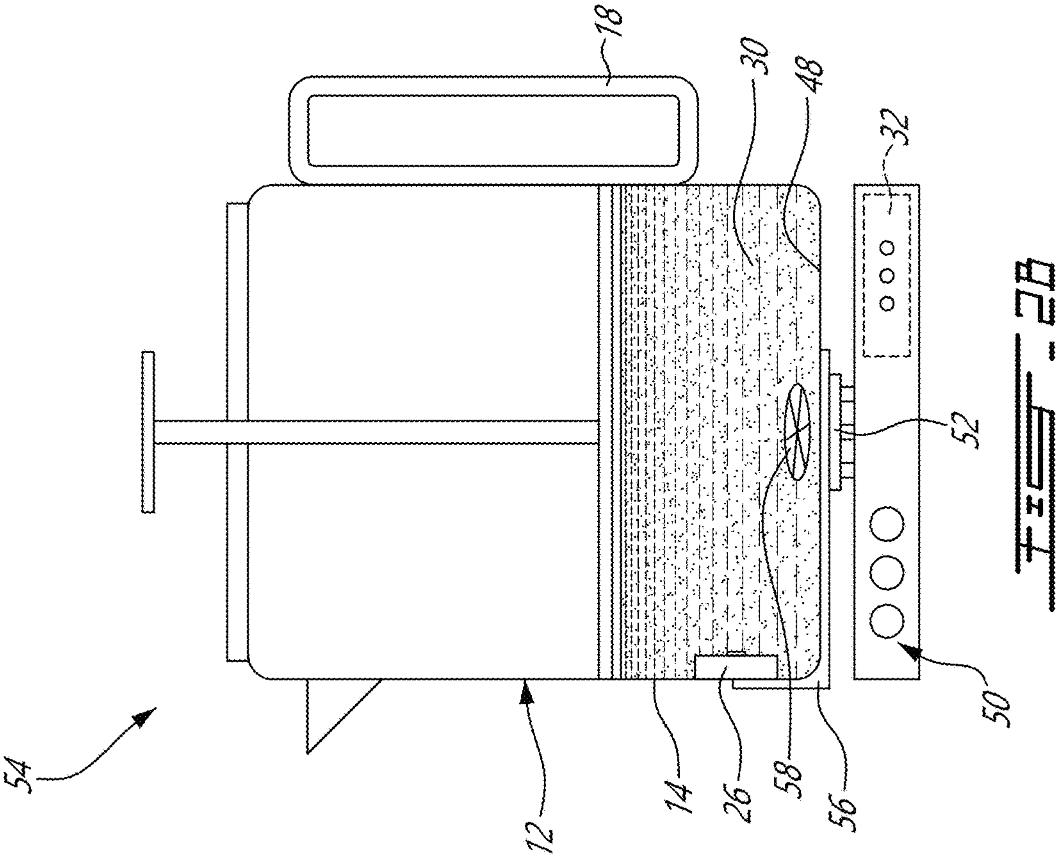

With reference to FIG. 2B, an extractor 54 according to a fourth illustrative embodiment will now be described. Since the extractor 54 is similar to the extractor 46, only the differences therebetween will be described herein for concision purposes.

The UA 26 of the extractor 54 is mounted to the main reservoir 14 of the container 12 on the peripheral side thereof opposite the handle 18 near the bottom 48. The container 12 further includes a connecting element 56 that extends between the UA 26 and outside surface of the bottom 48 for coupling the UA and sensor 36 to the docking base 50. The connecting element 56 conventionally includes electricity conducting material in contact with both the UA 26 and sensor 36 to the docking base 50. Since such connecting element is believed to be well known in the art, it will not be described herein in more detail for concision purposes.

The extractor 54 further comprises a stirring element 58 in the form of an impeller that is configured to be driven contactless, inductively or magnetically by the docking base 50. For that purpose, the docking base 50 is provided with corresponding driving elements.

Since inductively driven and magnetically driven impellers are believed to be well known in the art, they will not be described herein in more detail for concision purposes.

According to another illustrative embodiment (not shown), the impeller is wired to controller 32.

According to still another illustrative embodiment (not shown), another stirring mechanism than an impeller is provided.

Figure 3A:
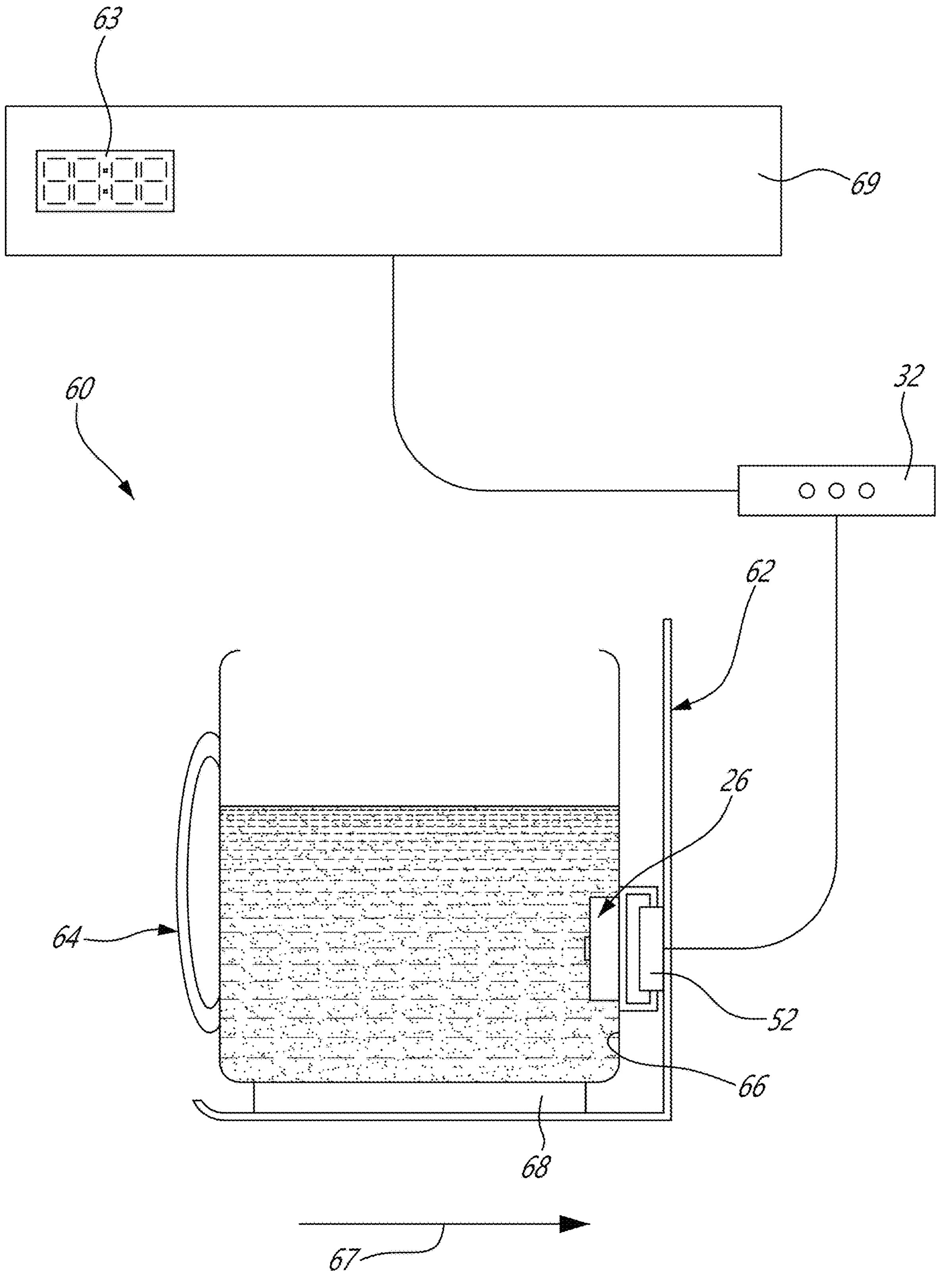
FIGS. 3A-3D are schematic views of a cold brew coffee extractor according to sixth, seventh, eighth and ninth illustrative embodiments respectively; the extractors being in the form of insert units for a refrigerator.

With reference to FIG. 3A, an extractor 60 according to a sixth illustrative embodiment will now be described. Since the extractor 60 is similar to the extractors 10, 40, 46, and 54, only the differences therebetween will be described herein for concision purposes.

The extractor 60 is in the form of a docking station such as in a countertop or a refrigerator insert/decanter combo comprising a docking station 62 integrated in a refrigerator (not shown) and a decanter 64 having the UA 26 affixed or integrated to its peripheral wall 66. The docking station 62 and decanter 64 are configured for easy connection therebetween when the decanter 64 is put on the docking station 62. For example, the UA 26 is integrated to the decanter 64 so as to be registered with the coupler 52 of the docking station 62 when the decanter 64 is put on a base 68 provided at the bottom of the docking station 62.

According to the sixth illustrative embodiment, the coupling between the UA 26 and the coupler 52 of the docking station 62 is of the inductive or magnetic type.

According to another illustrative embodiment, the coupling can be mechanical.

The UA 26 with integrated sensor 36 can be integrated to the wall 66 of the decanter 64 or be provided as a removable unit.

The controller 32 can be operatively coupled or integrated to the refrigerator controller 69 so that the extractor 60 can be controlled via the refrigerator control panel (not shown).

According to another embodiment (not shown), the extractor 60 is provided with its own input controls (not shown).

In other words, the UA 26 is integrated to the decanter 64 and the power supply is integrated to the refrigerator, but all the controls and electronics can be integrated either on the decanter 64 or refrigerator. When such controls and/or electronics are integrated to the refrigerator, they can be part of a door thereof (such as the controls) or hidden inside the main body.

In operation of the extractor 60, the decanter 64, with the UA 26 therein, is positioned in the docking station 62 (see arrow 67). The docking station 62, further including a water dispenser, automatically detects the presence of the decanter 64 by the coupling thereof with the coupler 52 and begins filling the decanter 64 until a predetermined level is reached. Conventional ultrasound sensors (not shown) or other types of sensors are including in the docking station for that purpose (not shown).

It is to be noted that the decanter 64 has been pre-filled with soluble coffee grain or with a coffee or tea bag or the likes (not shown).

In some embodiment, the controller 32 of the extractor or the controller 69 of the refrigerator includes a timer 63 to inform the user when the cold brew coffee is ready.

It is to be noted that the coupling between the decanter 64 and docking station 62 is not limited to be done through the peripheral wall 66 of the decanter 64 and can alternatively be done through the bottom thereof.

According to another illustrative embodiment, the docking station 62 can be integrated to another home appliance or the likes (not shown) or be provided as an independent device (not shown).

While the extractor 60 has been described with its container being in the form of a decanter 64, it is not limited to such an embodiment and the container can take other forms, such as a mug.

Figure 3B:
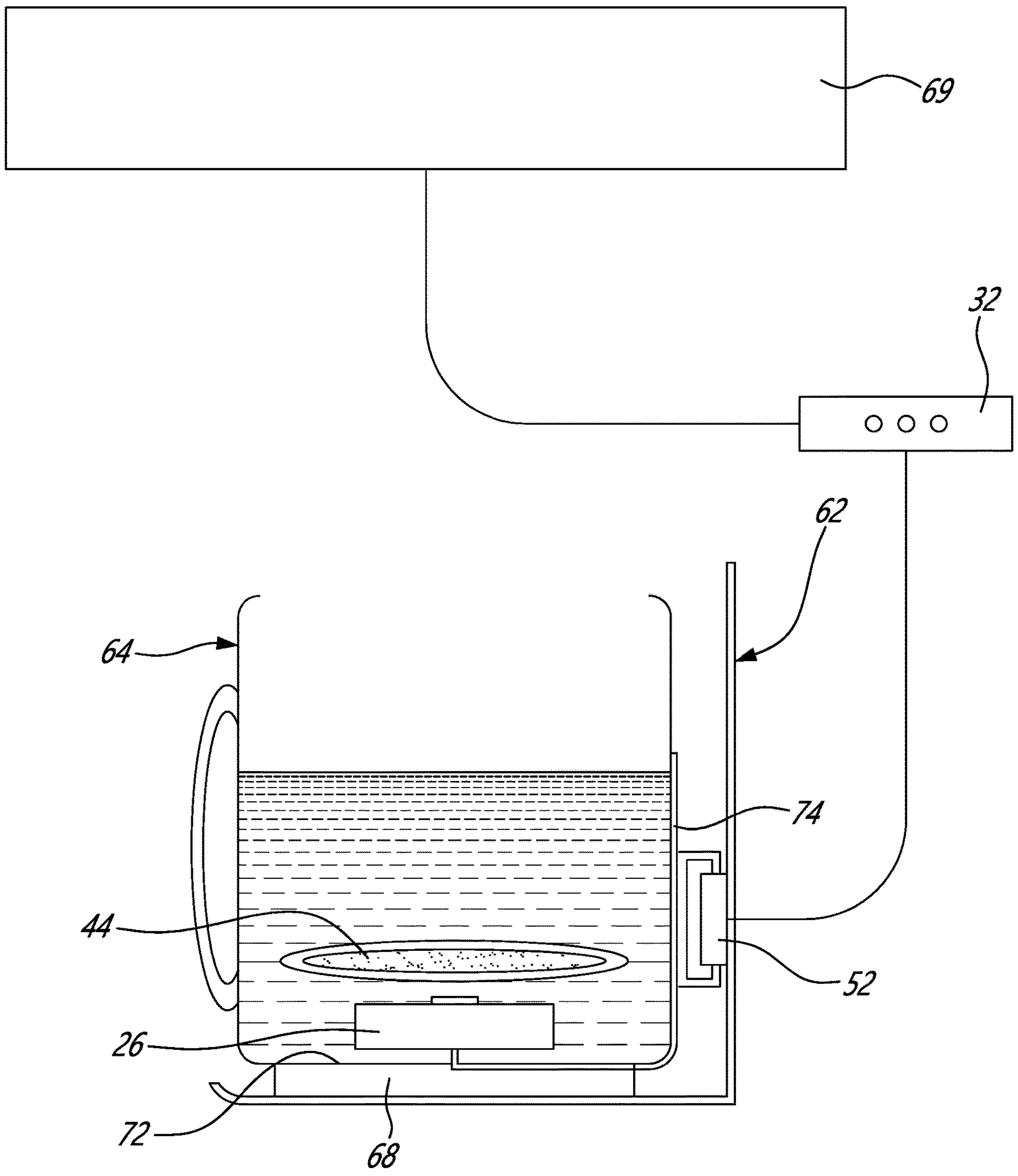

With reference to FIG. 3B, an extractor 70 according to a seventh illustrative embodiment will now be described. Since the extractor 70 is similar to the extractor 60, only the differences therebetween will be described herein for concision purposes.

The UA 26 of the extractor 70 is secured to the decanter 64 at the bottom 72 thereof, similarly to in the embodiment shown in FIG. 2B. The decanter 64 further includes a coupling portion 74, in the form of a conductive surface, that is connected to the UA 26, for connecting to the refrigerator coupler 52.

As can be seen in FIG. 3B, the coffee can be provided in a conventional filter bag 44.

Figure 3C:
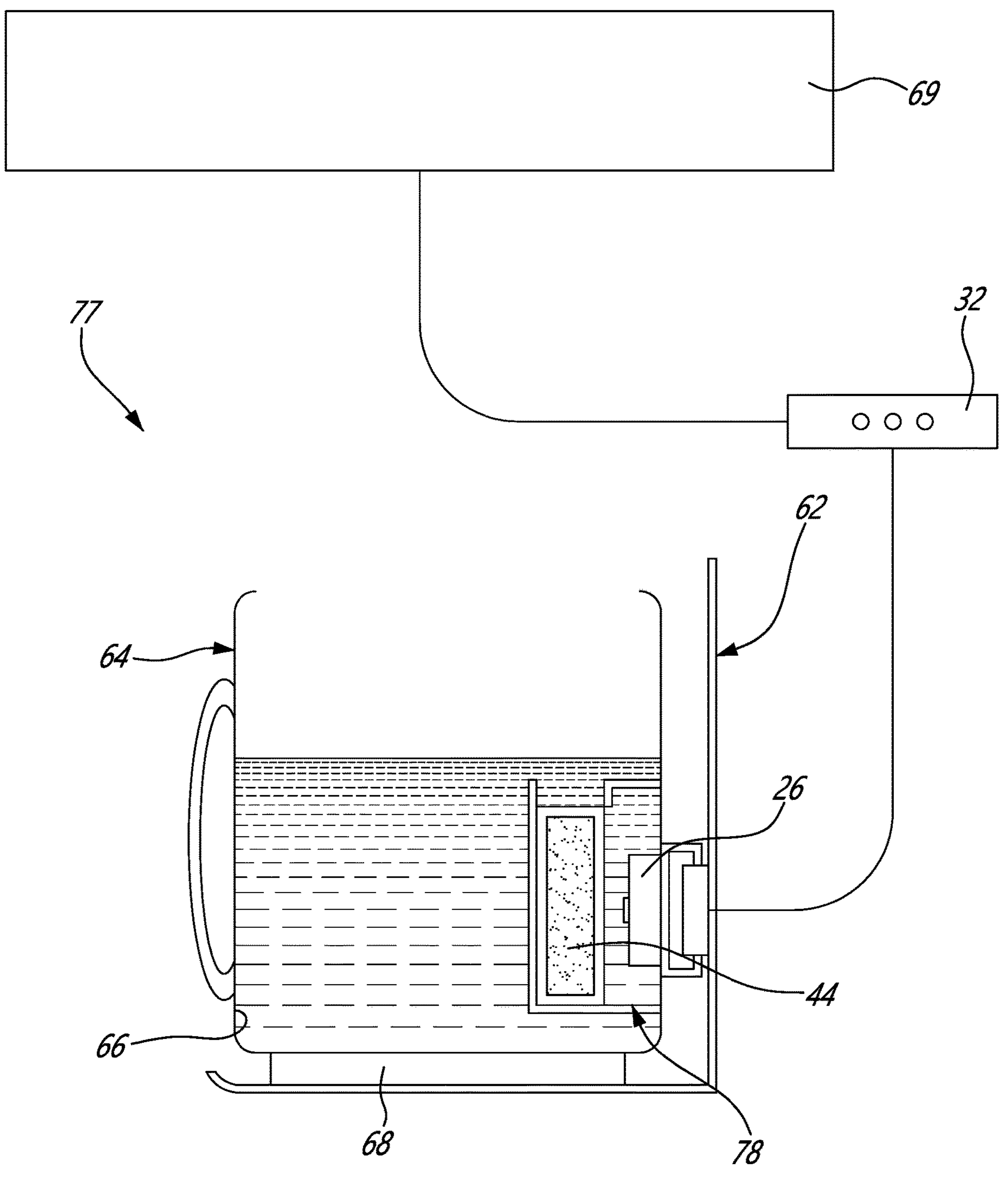

With reference to FIG. 3C, an extractor 77 according to an eight illustrative embodiment will now be described. Since the extractor 77 is similar to the extractor 60, only the differences therebetween will be described herein for concision purposes.

Compared to the extractor 60, the extractor 77 further includes a receptacle 78 that is secured or mountable to the decanter 64 on its peripheral wall 66 so as to be registered with the UA 26. The receptacle 78 is in the form of a fluid-transparent support that allows receiving a bag or pack 44 of soluble coffee therein. The support 78 maintains the bag 44 in close proximity to the UA 26, thereby maximizing the extraction speed.

The support 78 is not limited to the illustrated embodiment and can take any fixed or removable form that can hold a soluble coffee bag or pack 44 so that it is immersed when there is water in the decanter 64.

Figure 3D:
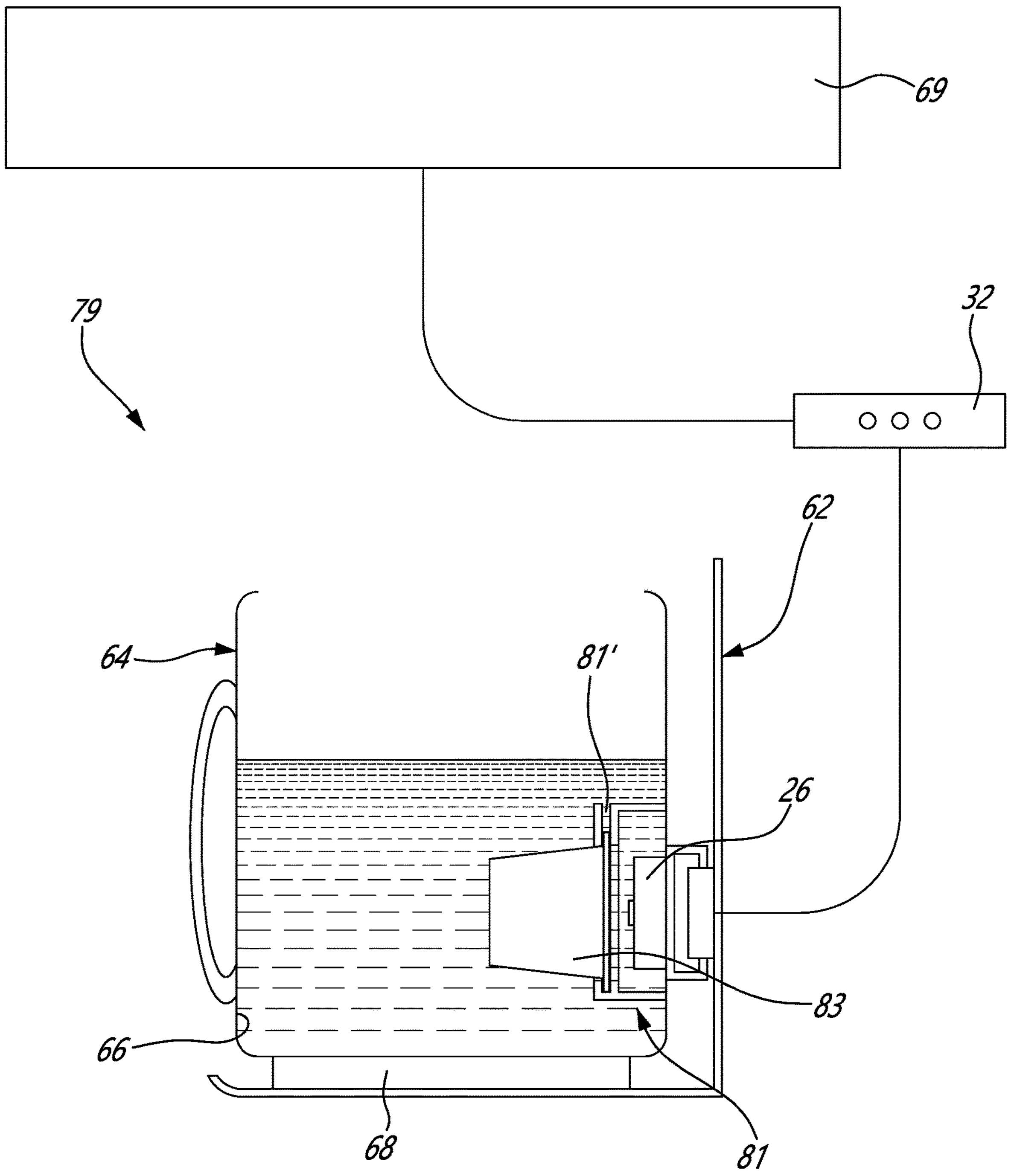

FIG. 3D illustrates an extractor 79 according to ninth illustrative embodiment. Since the extractor 79 is very similar to the extractor 77, only the differences therebetween will be described herein in more detail.

The extractor 79 includes a receptacle 81 that is configured to receive a closed capsule or pod 83 and position the same in close proximity with the UA 26. For that purpose, the receptacle 81 include a rail 81' to slidably receive the flange of the capsule/pod 83. The top of the capsule 83 can be pierced or teared by a user prior to the insertion of the capsule 83 in the receptacle 81. According to another illustrative embodiment, the extractor 79 further includes a capsule-opening mechanism (not shown) in operational relationship with the receptacle 81 to open or pierced the capsule 83 when it is inserted in the receptacle 81.

According to another illustrative embodiment, other means than the rails 81' can be used to receive and position the capsule/pod 83.

Figure 4:
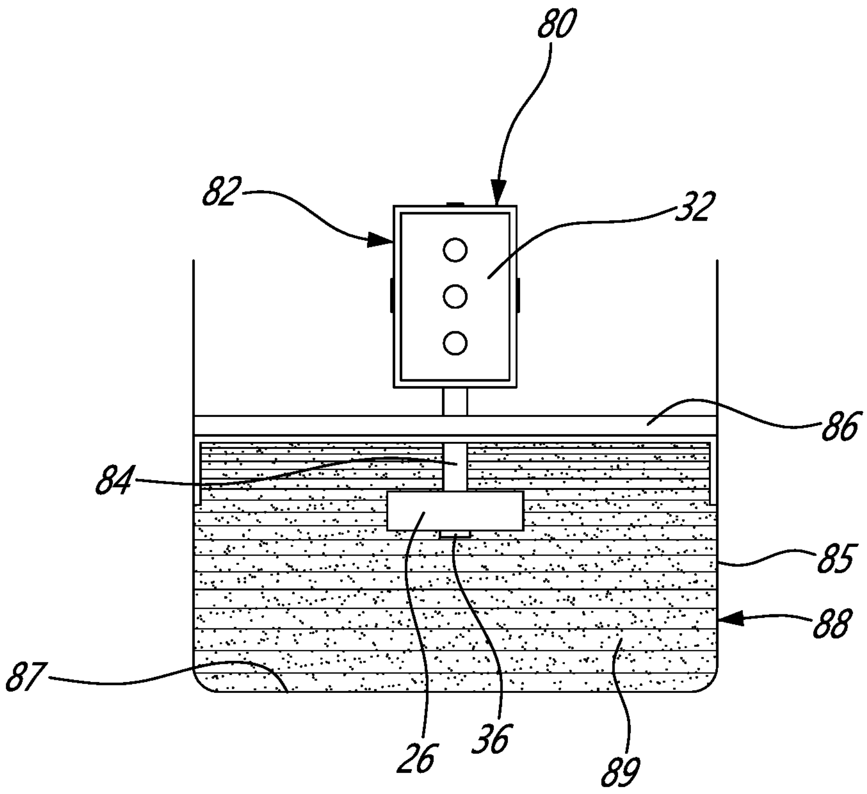
FIG. 4 is a schematic view of a cold brew coffee extractor according to a tenth illustrative embodiment; the extractor being in the form of a handheld unit.

With reference to FIG. 4, an extractor 80 according to a tenth illustrative embodiment will now be described.

The extractor 80 is in the form of a handheld device comprising a handle 82 having a controller 32 integrated thereto and the UA 26, having or not a sensor 36 integrated or mounted thereto, the UA being mounted to the handle 82 via a stem 84 so as to be distanced therefrom. The stem 84 further acts as a conduit for connectors between the UA 26/sensor 36 and the controller 32.

A cover 86 is further provided, that is adapted to fit into the peripheral wall 85 of the container 88 and that is configured to removably receive and support the handheld portion of the extractor 80 within the container 88.

Such a cover 86 can further be configured to act as a strainer, similarly to the screen 24 in FIG. 1A.

According to another embodiment (not shown), the cover 86 is omitted and the stem 84 is made sufficiently long that the handle 84 can remain out of the beverage mixture 89 when the extractor 80 is inserted in the container 88 with the UA 26 abutting the bottom 87 of the container 88. In such a case, the handle 82 simply leans against the wall of the container.

According to still another illustrative embodiment (not shown), the extractor 80 further includes a holder configured to receive a back or pack of coffee or of another water-soluble material.

As described hereinabove, the operational time of the extractor 80 can be controlled by a timer or using one or more sensors (all not shown), which may be integrated in the handheld device 80 or provided separately.

With reference to FIG. 5, an extractor 90 according to an eleventh illustrative embodiment will now be described. Since the Extractor 90 is similar to the extractor 10, only the differences therebetween will be described herein for concision purposes.

The extractor 90 comprises a container 92, a fillable reservoir 94 that is mounted in the top portion of the container 92 to be filled with water 95, a soluble coffee-receiving housing 96 that is mounted to the reservoir 94 thereunder so as to be in fluid communication therewith, to be filled with soluble coffee 97, a UA 26 mounted to the housing 96 therein within the fluid passage 98 between the reservoir 94 and housing 96, a controller 32 connected to the UA 26 as described hereinabove, and a water detection sensor 100 mounted at the bottom of the reservoir 94 and coupled to the controller 32 so as to detect when the reservoir 94 is empty. Since water detection sensors are believed to be well known in the art, they will not be described herein in more detail for concision purposes.

The fillable reservoir 94 includes a top wall 93 that extends larger than the peripheral wall of the container 92, yielding a flange 99 that acts as a mechanical stop that prevents the reservoir 94 from descending too low within the container 92. The resulting space between the bottom of the reservoir 94 and the bottom of the container 92 defines a coffee-receiving volume.

According to another illustrative embodiment (not shown), the reservoir 94 is maintained in place in the container 92 using other means than the illustrated flange 99. For example, the reservoir can be integrally formed into the container or the container 92 can include an inner flange to act as a support for the reservoir.

The UA 26 is so mounted to the water reservoir 94 so as to act as a vaporizer, which receives water from the reservoir 94 and sprays water droplets through the soluble coffee 97 in the housing 96, extracting the tasty compounds therefrom, resulting in cold brew coffee 102 that drips at the bottom of the container 92. The housing 96 is further configured to act as a coffee filter. The amount of water sprayed can be controlled based on time or water level as described hereinabove. The efficiency of the process can further be controlled by the intensity of the atomizer 26.

The water reservoir 94/soluble coffee housing 96 ensemble can then be removed to access the cold brew coffee 102.

While the controller 32 is shown as a separate unit, it can be integrated to the container 92.

According to still another embodiment, a support can be provided in the housing to receive a coffee package or bag in close proximity with the UA 26, as illustrated hereinabove.

According to still another illustrative embodiment, the housing 96 is mounted to the reservoir 94 and or configured to be immersed in the water 95 during operation.

According to yet another illustrative embodiment, the housing 96 is removably mounted to the UA 26.

It is to be noted that many modifications could be made to the extractors 10, 40, 54, 60, 70, 77, 79, 80 and 90 described hereinabove and illustrated in the appended drawings. For example:

- the dimensions of their containers and the number and positions of the UAs 26 can be different than illustrated, so the extractors 10, 40, 54, 60, 70, 77, 80 or 90 can be scaled up, such as for an industrial application as opposed to a personal production, and/or for further speeding up the extraction;
- the UA 26 may include one or more ultrasound transducers;
- the controller 32 are configured so that the extractors 10, 40, 54, 60, 70, 77, 80 or 90 are energized via a power grid and/or using batteries;
- while the extractors 10, 40, 54, 60, 70, 77, 80 and 90 have been described with reference to cold brew coffee, they can be adapted for producing cold brew teas or other such beverages.

Although an extractor for cold brew coffee or the like has been described hereinabove by way of illustrative embodiments thereof, it can be modified. It is therefore to be understood that numerous modifications may be made to the illustrative embodiments and that the scope of the claims should not be limited by the preferred embodiment but should be given the broadest interpretation consistent with the description as a whole.

What is claimed is:

1. A cold beverage extractor comprising:

a container;

an ultrasonic atomizer that is mounted to the container and being operable to accelerate extraction of at least some compounds from a substance dissolved in a water-based solvent when the water-based solvent is in the container so as to be in contact with the ultrasonic atomizer; and a sensor coupled to the ultrasonic atomizer to determine a quality of a beverage resulting from the substance being dissolved in the water-based solvent.

2. The cold beverage extractor as recited in claim 1, wherein the container is a French press including a plunger having proximate and distal ends, a pusher at the proximate end, and a filter screen at the distal end.

3. The cold beverage extractor as recited in claim 2, wherein the ultrasonic atomizer is secured to the plunger, on the side of the filter screen opposite the pusher.

4. The cold beverage extractor as recited in claim 3, wherein the container further includes a handle; the controller being housed in one of the pusher and handle.

5. The cold beverage extractor as recited in claim 3, wherein the ultrasonic atomizer is integrated to the container so as to be in fluid contact with an interior of the container; the cold beverage extractor further comprises a docking base including the electronic controller and having a coupler for coupling the ultrasonic atomizer to the controller when the container is sat on the docking base.

6. The cold beverage extractor as recited in claim 5, further comprising a stirring mechanism mounted to the container, therein, and that is coupled to the controller so as to be controlled thereby.

7. The cold beverage extractor as recited in claim 6, wherein the stirring mechanism is driven contactless.

8. The cold beverage extractor as recited in claim 2, further comprising an electronic controller coupled to the ultrasonic atomizer for driving the ultrasonic atomizer.

9. The cold beverage extractor as recited in claim 1, further comprising an electronic controller coupled to the ultrasonic atomizer for driving the ultrasonic atomizer.

10. The cold beverage extractor as recited in claim 9, wherein the electronic controller includes at least one indicator that is indicative of at least one operational state of the cold beverage extractor.

11. The cold beverage extractor as recited in claim 9, wherein the ultrasonic atomizer is integrated to the container so as to be in fluid contact with an interior of the container; the cold beverage extractor further comprising a docking base including the electronic controller and having a coupler for coupling the ultrasonic atomizer to the controller when the container rests on the docking base.

12. The cold beverage extractor as recited in claim 11, further comprising a stirring mechanism mounted to the container, therein, and coupled to the controller so as to be controlled thereby.

13. The cold beverage extractor as recited in claim 12, wherein the stirring mechanism is driven contactless.

14. The cold beverage extractor as recited in claim 1, wherein the substance dissolved in the water-based solvent is selected from the group consisting of coffee and tea.

15. The cold beverage extractor as recited in claim 1, wherein the quality is selected from the group consisting of a color and a concentration of the beverage.

16. The cold beverage extractor as recited in claim 1, further comprising a controller; wherein at least one of the ultrasonic atomizer and sensor is wirelessly coupled to the controller.

17. The cold beverage extractor as recited in claim 1, further comprising a timer coupled to the ultrasonic atomizer to cause an operation of the ultrasonic atomizer for a determined time.

18. The cold beverage extractor as recited in claim 1, wherein the ultrasonic atomizer is removably mounted to the container.

19. The cold beverage extractor as recited in claim 1, wherein the ultrasonic atomizer is part of a handheld device comprising a handle; the ultrasonic atomizer being mounted to the handle via a support member; the cold beverage extractor further comprising an electronic controller integrated to the handle and coupled to the ultrasonic atomizer for driving the ultrasonic atomizer.

20. The cold beverage extractor as recited in claim 19, further comprising a cover for the container that is mounted to the support member; the cover being configured and sized to complement a section of the container so as to be complementary insertable therein.

21. The cold beverage extractor as recited in claim 20, wherein the cover is further configured to act as a strainer.

22. A cold beverage extractor, comprising:

a container;

an ultrasonic atomizer that is mounted to the container and being operable to accelerate extraction of at least some compounds from a substance dissolved in a water-based solvent when the water-based solvent is in the container so as to be in contact with the ultrasonic atomizer; and an electronic controller coupled to the ultrasonic atomizer for driving the ultrasonic atomizer;

wherein the ultrasonic atomizer is integrated to the container so as to be in fluid contact with an interior of the container; the cold beverage extractor further comprising a docking base including the electronic controller and having a coupler for coupling the ultrasonic atomizer to the controller when the container rests on the docking base wherein the docking base is integrated to a refrigerator unit.

23. The cold beverage extractor as recited in claim 22, wherein the controller is part of the refrigerator unit.

24. The cold beverage extractor as recited in claim 22, wherein the docking base is part of a docking station that further includes a water dispenser.

25. A cold beverage extractor comprising:

a container;

an ultrasonic atomizer that is mounted to the container and being operable to accelerate extraction of at least some compounds from a substance dissolved in a water-based solvent when the water-based solvent is in the container so as to be in contact with the ultrasonic atomizer; and a receptacle secured to the container therein for receiving a bag, a pack, a capsule or pod including the substance; the receptacle being positioned in close proximity to the ultrasonic transducer.

26. A cold beverage extractor comprising:

a container;

an ultrasonic atomizer that is mounted to the container and being operable to accelerate extraction of at least some compounds from a substance dissolved in a water-based solvent when the water-based solvent is in the container so as to be in contact with the ultrasonic atomizer; and further comprising i) a reservoir, that is removably mountable into the container at the upper portion thereof, yielding a coffee beverage-receiving volume between the reservoir and container, ii) a housing for receiving soluble coffee and being removably mounted to the reservoir thereunder so as to be in fluid communication with both the reservoir and beverage-receiving volume, and ii) an electronic controller coupled to the ultrasonic atomizer for driving the ultrasonic atomizer; the ultrasonic atomizer being mounted to one of the reservoir and housing within a fluid-passage between the reservoir and housing;

whereby, in operation, the ultrasonic atomizer acting as a vaporizer, which receives water from the reservoir and sprays water droplets through the soluble coffee in the housing, yielding cold brew coffee that drips into the volume.

* * * * *